United States Patent [19]
Broan et al.

[11] Patent Number: 6,051,112
[45] Date of Patent: Apr. 18, 2000

[54] EXTRACTION METHOD AND APPARATUS

[75] Inventors: Christopher John Broan, Preston; Trevor James Williams; Adrian George Bailey, both of Southampton, all of United Kingdom

[73] Assignee: British Nuclear Fuels PLC, United Kingdom

[21] Appl. No.: 09/091,686

[22] PCT Filed: Dec. 17, 1996

[86] PCT No.: PCT/GB96/03109

§ 371 Date: Jun. 19, 1998

§ 102(e) Date: Jun. 19, 1998

[87] PCT Pub. No.: WO97/23263

PCT Pub. Date: Jul. 3, 1997

[30] Foreign Application Priority Data

Dec. 21, 1995 [GB] United Kingdom .................. 9526130

[51] Int. Cl.[7] .................................................. H05F 03/00
[52] U.S. Cl. .......................................................... 204/164
[58] Field of Search ............................................. 204/164

[56] References Cited

U.S. PATENT DOCUMENTS

| | | | |
|---|---|---|---|
| 4,033,851 | 7/1977 | Oros . | |
| 4,161,439 | 7/1979 | Warren et al. . | |
| 4,200,516 | 4/1980 | Pope | 204/302 |
| 4,224,124 | 9/1980 | Pope | 204/186 |
| 4,606,801 | 8/1986 | Prestridge et al. | 204/186 |
| 4,634,510 | 1/1987 | Mintz et al. | 204/188 |
| 5,385,658 | 1/1995 | Scott . | |
| 5,411,651 | 5/1995 | Yamaguchi et al. . | |

OTHER PUBLICATIONS

Zhong–Mao Gu, A new Liquid Membrane Technology–Electrostatic Pseudo Liquid Membrane, *J. of Membrane Science* Abstract XP 000172713, 52(1):77–88 Aug. 15, 1990.

*Primary Examiner*—Kathryn Gorgos
*Assistant Examiner*—Jonathan Brown
*Attorney, Agent, or Firm*—Myers Bigel Sibley & Sajovec, P.A.

[57] ABSTRACT

A method and an apparatus for the extraction of a solute from an aqueous feed solution into an aqueous stripping solution are described. The apparatus comprises vessel means for containing a continuous non-polar carrier liquid, the carrier liquid having therein a chemical having an affinity for ions of at least one species in said solute in said feed solution; means for providing at least one stream of each of said feed (42) and stripping solutions (46) through said carrier liquid in said vessel means; electrode means (30, 32, 34, 36) for applying a first and a second high voltage electrostatic field to each of said feed and stripping solution streams respectively, so as to cause said streams to break up into a multiplicity of small droplets; baffle means (26) positioned between the electrode means for establishing said first and second high voltage electrostatic fields, said baffle means allowing the movement of said carrier liquid but minimizing transfer across the baffle of feed and stripping solutions; mutually separate receiving means for collecting said feed and stripping solutions after they have passed through said first and second high voltage electrostatic fields, respectively; the apparatus being characterized by further including means for providing and controlling the first (100) and second high voltage electrostatic fields (102) such that the first and second voltages are different and controllable.

6 Claims, 2 Drawing Sheets

EXTRACTION METHOD AND APPARATUS

The present invention relates to improvements to the so-called "electrostatic pseudo liquid membrane" (ESPLIM) method of separation of metal ions from aqueous solutions.

Chinese patent application number CN 86101730A describes a separation technique which enables the purification of aqueous solutions and concentration of solutes in aqueous solutions.

The technique includes the steps of passing droplets of an aqueous feed solution which it is desired to purify and/or from which it is desired to extract metal ions for example, under the influence of gravity, through a first region of a non-polar carrier liquid in which is dissolved a chemical having high affinity for the metal ion or ions to be removed whilst simultaneously subjecting the droplets to a high voltage electrostatic field so as to break up the droplets into a multiplicity of much smaller droplets in order to increase their surface area to volume ratio. The metal ions are complexed by the dissolved chemical into the carrier liquid and are driven, principally by the concentration gradient so formed, to a second region in the non-polar carrier liquid through which is passing under the influence of gravity a stream of droplets of an aqueous "stripping" solution which has a chemically higher affinity for the metal ion than the complexing chemical in the carrier liquid. The stripping solution droplets are also simultaneously subjected to a high voltage electrostatic field so as to break them up into a multiplicity of much smaller droplets and thus to increase their surface area to volume ratio. The metal ions are thus concentrated into the stripping solution and the aqueous feed solution is largely purified of the metal ions. As the very small droplets of the purified feed solution and the stripping solution, the former now having a lower concentration of the metal ions and the latter now having a high concentration of the required metal ions, pass out of the high voltage electrostatic field, they coalesce and fall under gravity into mutually separated first and second collecting vessels, respectively, and from which they can be removed.

The first and second regions of the carrier liquid are separated by a barrier or baffle which is intended to allow substantially uninterrupted flow and passage of the carrier liquid to and from the first and second regions but, is also intended to impede or prevent the passage of the aqueous feed solution from the first region into the second region and, the passage of the stripping solution from the second region to the first region.

According to a first aspect of the present invention, there is provided a method for the extraction of a solute from an aqueous feed solution into an aqueous stripping solution, the method comprising the steps of providing at least one stream of each of said feed solution and said stripping solution passing through a continuous phase of a non-polar carrier liquid; said carrier liquid having therein a chemical having an affinity for ions of at least one species in said solute in said feed solution; each of said at least one streams of feed and stripping solutions being under the influence of a first and a second high voltage electrostatic field, respectively, for at least a part of their passage time through said carrier liquid so as to break up said streams into a multiplicity of droplets of each of said solutions; providing baffle means between said at least one streams of each of the feed and stripping solutions, the baffle means being to minimise transfer of feed solution towards said stripping solution stream and transfer of stripping solution towards said feed solution stream; said baffle means also being positioned between the separate high voltage electrostatic fields to which the feed and stripping solution streams are subjected; and, providing mutually separated receiving means to collect the streams of said feed and said stripping solutions after they pass out of said high voltage electrostatic field; said method being characterised in that said high voltage electrostatic fields to which said feed and stripping streams are subjected are different.

It has been found that there exists an optimum intensity of electrostatic field strength in the feed and stripping cells. At field strengths below this optimum level, dispersion of the feed and stripping streams into the carrier liquid is inefficient so that the surface area between the droplets of the feed solution and carrier liquid; and, between the stripping solution droplets and carrier liquid is less than optimum, and therefore, rates of mass transfer between the aqueous and organic phases is significantly less efficient than it might otherwise be. Conversely, at field strengths above the optimum, the droplets of the aqueous phases are so fine that the baffle does not prevent their passage or migration towards the other region of the cell, thus increasing so-called "swelling" or leakage across the baffle. Clearly, this is undesirable as it may reduce the concentration of the targeted species in the stripping solution and/or cause unwanted contamination in either or both of the feed and stripping streams.

Thus, the optimum electrostatic field strengths for the feed and stripping solutions will be different. Consequently, a cell which employs a common voltage for both regions must either be a compromise in both regions and/or at least one region is working at significantly less than optimum efficiency.

The chemical reaction involved in the present invention, the metal ion or ions transferring from an aqueous species complex with a chemical having a high affinity for the metal ion and which is dissolved in the organic carrier phase and similarly, the reverse process where the metal ion is removed from the chemical in the organic carrier phase by aqueous stripping solution may be slow and the rate-determining step. In this case the advantage is gained from a higher surface area of aqueous droplets for this reaction to occur, and therefore, it might be from a higher dispersion voltage on either the feed or the stripping side, depending on which of the two reactions, ie removal of the metal ion into the carrier phase or extraction of the metal ion from the carrier phase, depending on which is the slower step.

When the metal ion is transferring from the small aqueous droplets of the feed solution into the carrier phase, it will only have to diffuse through a maximum of the radius of the droplet before reaching the interface with the continuous carrier phase. However, when the metal ion is transferring from the continuous carrier phase into the dispersed droplets of the stripping solution, it has to diffuse through the continuous carrier phase until it encounters a droplet. Therefore, if the droplets are relatively few and far between this can be many times further than the radius of the droplet on the feed side and so, transfer from the continuous carrier phase to the dispersed aqueous stripping phase tends to be much less efficient than transfer from the aqueous feed solution to the continuous carrier phase.

Therefore, in the method of the present invention, it is desirable to increase the number of droplets on the stripping side so as to lessen the distance which the metal ions need to travel before encountering a droplet of the aqueous stripping solution. A higher flow rate an the stripping side than is strictly dictated by the chemical considerations of the relative quantities of metal ion to be stripped from the carrier phase and the quantity of stripping phase necessary to achieve this objective could be employed and the stripping solution may be recycled through the organic carrier phase until the desired concentration of metal ion is reached. However, a high flow rate of the aqueous stripping solution and recycling is not only more complex, it is also increases the amount of cross contamination from the feed side by leakage or "swelling" across the baffle, since the strip solution will pickup the same number of droplets of feed solution in each pass, irrespective of how much of the desired species it is succeeds in extracting from the organic phase. Experiments have shown that best results are achieved, according to the method of the present invention, by having a higher voltage on the stripping side than on the feed side so as to achieve a higher dispersion and hence higher surface area to volume ratio of the aqueous stripping solution than of the aqueous feed solution.

The streams of the feed and/or stripping solutions may be constituted by continuous streams or by streams of droplets which are themselves disintegrated into much smaller droplets by the action of the high voltage electrostatic fields which are applied thereto.

According to a second aspect of the present invention, there is provided an apparatus for the extraction of a solute from an aqueous feed solution into an aqueous stripping solution, the apparatus comprising vessel means for containing a continuous non-polar carrier liquid, the carrier liquid having therein a chemical having an affinity for ions of at least one species in said solute in said feed solution; means for providing at least one stream of each of said feed and stripping solutions through said carrier liquid in said vessel means; electrode means for applying a first and a second high voltage electrostatic field to each of said feed and stripping solution streams respectively, so as to cause said streams to break up into a multiplicity of small droplets; baffle means positioned between the electrode means for establishing said first and second high voltage electrostatic fields, said baffle means allowing the movement of said carrier liquid but minimising transfer across the baffle of feed and stripping solutions; mutually separate receiving means for collecting said feed and stripping solutions after they have passed through said first and second high voltage electrostatic fields, respectively; the apparatus being characterised by further including means for providing and controlling the first and second high voltage electrostatic fields such that the first and second voltages are different and controllable.

In one embodiment of the apparatus according to the present invention, the electrostatic field strengths across the feed and stripping streams may be independently applied by the use of a single, multi-tap transformer to provide the desired optimum voltages in each case.

Alternatively, the first and second electrostatic fields may be independently applied by two separate transformers supplying different voltages.

In a further alternative embodiment, the different electrostatic field intensities may be provided by varying the distance between each pair of electrodes in the feed and stripping regions and applying, for example, a common voltage to each pair.

The electrodes may be made from mesh, perforated plate or from a wire array. One or more of the electrodes should be insulated so as to prevent a short circuit from occurring in the carrier liquid.

The intensity of the electrostatic field between the electrode pairs in the feed and stripping regions may alternatively or additionally be controlled by the nature and/or thickness of the insulating coating on the one or more electrodes.

BRIEF DESCRIPTION OF THE DRAWINGS

In order that the present invention may be more fully understood, examples will now be described by way of illustration only with reference to the accompanying drawings, of which.

Figure 1:
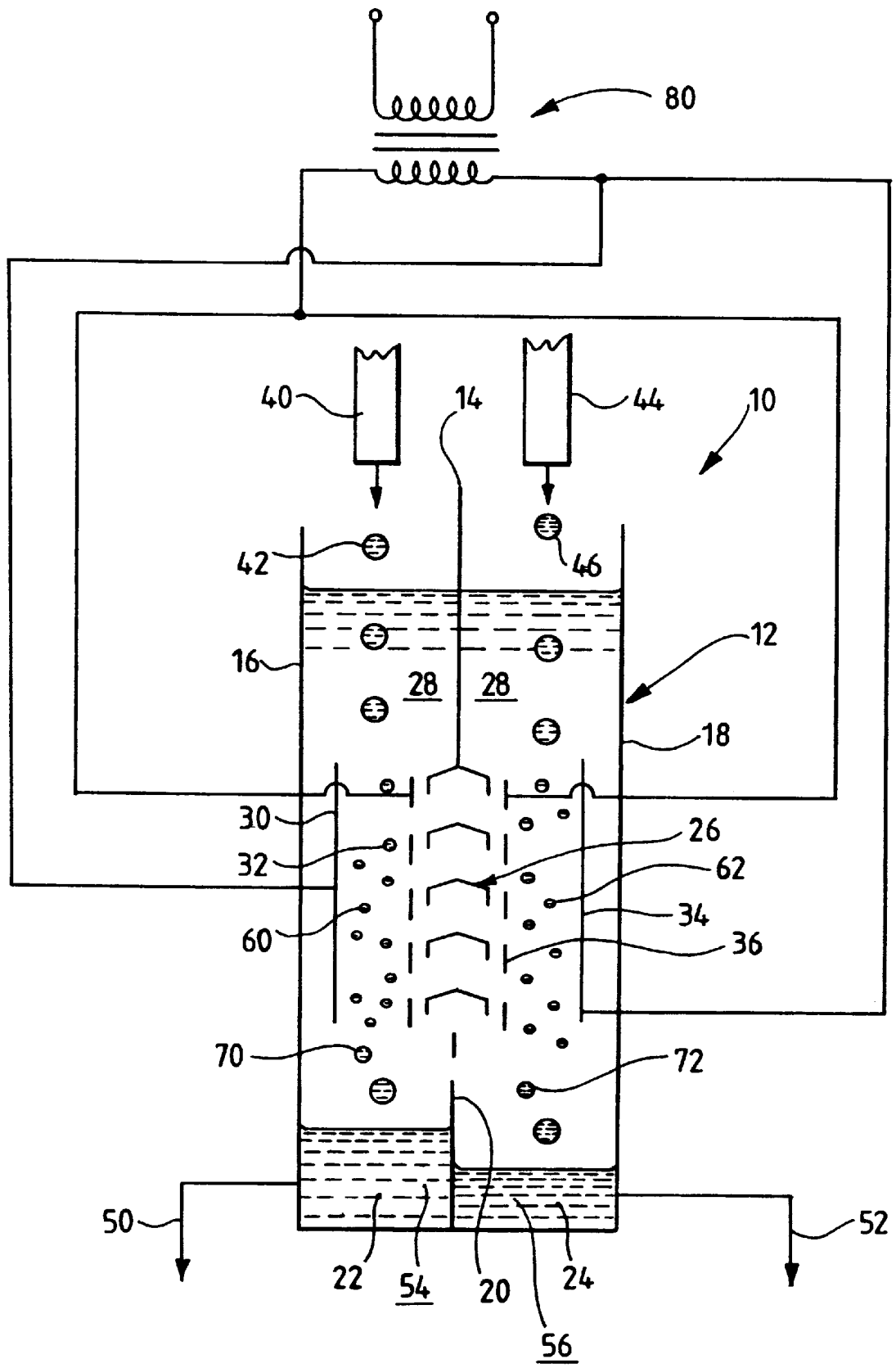
FIG. 1 shows a schematic arrangement or apparatus showing the basic operation and method of the prior art ESPLIM method.

Referring now to the drawings and where the same or similar features are denoted by common reference numerals.

FIG. 1 shows a schematic cross section through an apparatus 10 for carrying out the ESPLIM method of separation according to the prior art. The apparatus 10 comprises a reaction tank or vessel 12 which is divided at its upper portion by a wall 14 into an extraction cell 16 and a stripping cell 18. At the lower end of the tank 12 there is a wall 20 which divides the tank into two receiving vessels or settling tanks 22, 24 for the purified feed solution or raffinate and, for the concentrated extractant in the stripping solution, respectively. Situated between the upper wall 14 and the lower wall 20 is a baffle 26 which allows an organic carrier liquid 28, in this case kerosene, to move freely throughout the tank 12. Electrodes 30, 32 are situated in the extraction cell side 16, between which a first high voltage AC electrostatic field may be applied. Electrodes 34, 36 are situated in the stripping cell side 18, between which a second high voltage AC electrostatic field may be applied. In each of the cells 16, 18 at least one of the electrodes is insulated with, for example, a coating of polytetrafluoroethylene (PTFE) to prevent short circuiting within each cell. A controllable high tension AC supply 80 is provided for the electrodes so as to establish a desired potential therebetween. A conduit 40 is provided above the extraction cell 16 to supply a stream of feed solution 42 which is to be purified, into the carrier liquid 28. The conduit 40 has connected thereto pump means (not shown) and a reservoir tank (not shown) to provide a continuous supply of aqueous feed solution at a controlled rate. Another conduit 44 is provided above the stripping cell 18 to supply a stream 46 of aqueous stripping solution into the carrier liquid 28. The conduit 44 also has connected thereto pump means (not shown) and a reservoir tank (not shown) to provide a continuous supply of stripping solution at a controlled rate. Each of the receiving vessels 22, 24 have conduits 50, 52 to enable the raffinate 54 and the concentrate 56 to be drawn off as the level in each vessel rises or as required. The raffinate and concentrate are pumped to collection vessels (not shown) for disposal or further processing as required.

In operation, the apparatus 10 functions as follows and using as an example the extraction of cobalt metal ions from the feed solution 42 in which the Co ions are present at a concentration of 1000 ppm in a 0.1M aqueous sodium acetate solution, the feed solution being supplied at a flow rate of 200 ml/hr into the carrier liquid. The stripping solution comprises a 1.0M solution of sulphuric acid which is supplied at a flow rate of 10 ml/hr into the carrier liquid. The diluent kerosene carrier liquid 28 has dissolved therein 10 volume % of di-(2-ethylhexyl)phosphoric acid (D2EHPA) extractant. An AC electrostatic field of 3 KV supplied via a transformer from the mains supply is applied between the electrodes 30, 32 and 34, 36 to establish the first and second electrostatic fields. As the relatively large droplets of the feed solution 42 and stripping solution 46 fall into the extraction cell 16, they are subjected to the electrostatic fields between the electrodes 30, 32 and 34, 36 which have the effect of causing the relatively large droplets to break up into a multiplicity of microdroplets 60, 62 thereby greatly increasing the surface area to volume ratio of the two aqueous phases. In the extraction cell 16, the Co ions are extracted from the aqueous solution droplets due to the affinity of the D2EHPA thus causing the concentration of the Co-complex to rise in the extraction cell in the kerosene phase. Due to the concentration gradient so formed, the Co-complex diffuses through the kerosene through the baffle 26 towards the stripping cell 18 where the Co-complex reacts with the microdroplets 62 of the stripping solution where the Co-complex reacts with the sulphuric acid to free the D2EHPA, the Co ions reacting with the sulphuric acid and being concentrated therein. The D2EHPA then migrates back through the baffles 26 to the extraction cell 16 to establish a continuous chemical process. As the reacted droplets 60, 62 pass through the electrostatic fields under the influence of gravity, they eventually pass out of the electrostatic fields and begin to coalesce into larger droplets 70, 72 which fall into the receiving vessels 22, 24 as appropriate.

In experiments under the conditions described above, an initial feed solution of a Co concentration of 1000 ppm was purified to a concentration of 10 ppm in the raffinate 54, whilst the concentrate 56 had a concentration of 19,750 ppm of Co ions.

Therefore, it will be seen that the method makes it possible to concentrate metal ions to a level where it is both practicable and economic to extract the concentrated metal ions so as to recover and reuse the metal per se. An example of this may be uranium. It is also clear that the feed solution may be so purified as to make disposal easier and/or less hazardous.

Figure 2:
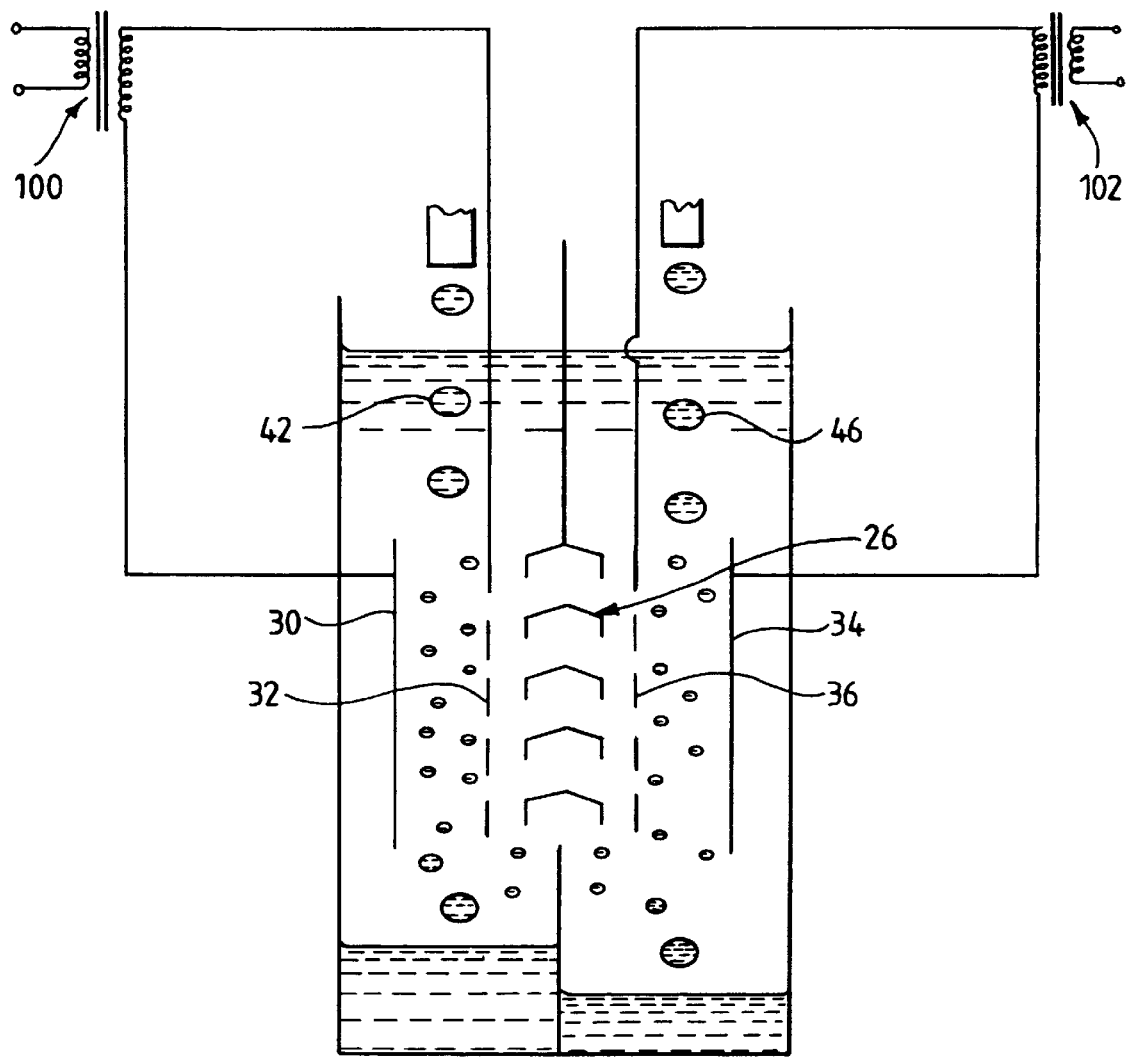
FIG. 2 which shows a schematic apparatus according to an embodiment of the second aspect of the present invention wherein means are provided to supply different voltages across electrodes in the feed and stripping regions.

FIG. 2 of the drawings shows a schematic apparatus according to an embodiment of the second aspect of the present invention. In this embodiment, the structure of the apparatus may also be substantially similar to that described with reference to FIG. 1 where electrodes 30, 32, 34 and 36 are provided as before in the feed and stripping regions respectively. However, two independent transformers 100, 102 each capable of supplying a different and controllable voltage from the other are used. Transformer 102, supplying electrodes 34, 36 in the stripping cell region, is maintained at a different voltage to that of transformer 100. The actual voltage levels applied in each region of the cell will be dependent on many factors including flow rate, chemicals employed, electrode geometry and others.

As ESPLIM cell as described with reference to FIG. 2 and having Teflon (trade name) insulated electrodes at 10 mm spacing was supplied with a feed solution consisting of 1000 ppm cobalt sulphate mixed with 0.1M sodium acetate and supplied at a rate of 11 ml/min. The stripping solution consisted of 1,0M sulphuric acid supplied at 3 ml/min and the organic carrier phase was Isopar M (trade name) containing 10% D2EHPA as the extractant. Dispersion of the solutions occurred efficiently at applied voltages of 6 kV in both cells, the average drop size decreasing with increasing voltage. When 6 kV was applied to the feed cell and 8 kV was applied to the stripping cell, the feed was efficiently extracted to leave a concentration of 9 ppm of cobalt in the raffinate 54. Stripping was also efficient to give a product solution containing 3400 ppm cobalt in the concentrate 56. The cobalt metal ion concentration complexed with the D2EHPA in the organic carrier phase reached a constant level of 350 ppm.

In contrast to the above, when a voltage of 6 kV was applied to both the feed and strip cells, the feed was again efficiently extracted such that the raffinate 54 contained only 10 ppm of cobalt. However, stripping was less efficient such that the concentrate product solution contained only 1600 ppm and the cobalt concentration in the organic carrier phase built up to a level of 3500 ppm over the course of the run, ie substantially greater than that measured in the run with 8 kV applied to the stripping side and very close to the maximum sustainable with that concentration of extractant. Thus, it is clearly demonstrated that under the particular conditions of the apparatus and materials in use that a stripping-side field intensity of at least 8 kV is required for the process to run efficiently. Of course, different apparatus geometry and material parameters may require different field intensities.

In a separate experiment, leakage or "swelling" was measured using 1M sulphuric acid in both feed and strip solutions so that no metal extraction into the organic phase could occur. This was confirmed by the absence of the intense blue colour characteristic of the tetrahedally coordinated cobalt present in the organic phase when extraction is enabled. When 6 kV was applied to the feed cell, the leakage was measured (from the cobalt concentration in the stripping side) to be 0.9%. When 8 kV was applied to the feed side the leakage increased to 2.1%. Thus, when 6 kV is applied to both feed and stripping-sides, the stripping is inefficient and the cobalt concentration in the product solution is reduced. However, when 8 kV is applied to both sides, the amount of cross contamination of the product by the feed due to leakage is also significantly increased. Hence, the optimum combination of efficient stripping and minimum leakage can only be obtained by utilising different voltages, and hence different field intensities, in the feed and stripping sides of the apparatus.

We claim:

1. A method for the extraction of a solute from an aqueous feed solution into an aqueous stripping solution, the method comprising the steps of providing at least one stream of each of said feed solution and said stripping solution passing through a continuous phase of a non-polar carrier liquid; said carrier liquid having therein a chemical having an affinity for ions of at least one species in said solute in said feed solution; each of said at least one streams of feed and stripping solutions being under the influence of a first and second high voltage electrostatic field, respectively, for at least a part of their passage time through said carrier liquid so as to break up said streams into a multiplicity of droplets of each of said solutions; providing baffle means between said at least one streams of each of the feed and stripping solutions, the baffle means being to minimise transfer of feed solution towards said stripping solution stream and transfer of said stripping solution towards said feed solution stream; said baffle means also being positioned between the separate high voltage electrostatic fields to which the feed and stripping solution streams are subjected; and, providing mutually separated receiving means to collect the streams of said feed and said stripping solutions after they pass out of said high voltage electrostatic field; said method being characterised in that said first and second high voltage electrostatic fields to which said feed and stripping streams are subjected are of different electrostatic field intensities.

2. An apparatus for the extraction of a solute from an aqueous feed solution into an aqueous stripping solution, the apparatus comprising vessel means for containing a continuous non-polar carrier liquid, the carrier liquid having therein a chemical having an affinity for ions of at least one species in said solute in said feed solution; means for providing at least one stream of each of said feed and stripping solutions through said carrier liquid in said vessel means; electrode means for applying a first and a second high voltage electrostatic field to each of said feed and stripping solution streams respectively, so as to cause said streams to break up into a multiplicity of small droplets; baffle means positioned between the electrode means for establishing said first and second high voltage electrostatic fields, said baffle means allowing movement of said carrier liquid but minimising transfer across the baffle of feed and stripping solutions; mutually separate receiving means for collecting said feed and stripping solutions after they have passed through said first and second high voltage electrostatic fields, respectively; the apparatus being characterised by further including means for providing and controlling the first and second high voltage electrostatic field intensities such that the first and second electrostatic field intensities are different and controllable.

3. An apparatus according to claim 2 wherein the means for providing and controlling the first and second voltages are two transformers.

4. An apparatus according to claim 2 wherein the means for providing and controlling the first and second voltages is a single multi-tap transformer.

5. Apparatus according to claim 2 wherein field intensity between the electrode means in the feed and stripping regions is controlled by spacing of said electrode means.

6. Apparatus according to claim 2 wherein the field intensity is controlled by the nature and/or thickness of an insulating coating on said electrode means.

* * * * *